United States Patent
Sheridan et al.

Patent Number: 5,433,674
Date of Patent: Jul. 18, 1995

[54] COUPLING SYSTEM FOR A PLANETARY GEAR TRAIN

[75] Inventors: William G. Sheridan, Southington; Gino J. Pagluica, Manchester, both of Conn.

[73] Assignee: United Technologies Corporation, Hartford, Conn.

[21] Appl. No.: 226,618

[22] Filed: Apr. 12, 1994

[51] Int. Cl.6 .............................................. F16H 1/48
[52] U.S. Cl. .................................................... 475/346
[58] Field of Search ............................ 475/346, 347

[56] References Cited

U.S. PATENT DOCUMENTS

| | | | |
|---|---|---|---|
| 2,830,473 | 4/1958 | Brown | 74/802 |
| 2,883,885 | 4/1959 | Upton | 475/346 |
| 2,968,922 | 1/1961 | Gilbert | 475/346 |
| 3,352,178 | 11/1965 | Lindgren et al. | 74/801 |
| 3,459,072 | 8/1969 | Shannon | 475/346 |
| 3,754,484 | 8/1973 | Roberts | 475/347 |
| 4,050,544 | 9/1977 | Kalyan et al. | 184/6.6 |
| 4,438,663 | 3/1984 | Eichenberger et al. | 74/760 |
| 4,657,410 | 4/1987 | Hibner | 384/99 |
| 5,058,452 | 10/1991 | El-Shafei | 74/573 F |

OTHER PUBLICATIONS

Marks' Standard Handbook for Mechanical Engineers, 9th Edition, pp. 8-35, 8-38.
PHW Wolff "The Design of Flexible Disk Misalignment Couplings", Proceedings of the Institution of Mechanical Engineers, v165; 1951, pp. 165-175.

*Primary Examiner*—Dirk Wright
*Attorney, Agent, or Firm*—Kenneth C. Baran

[57] ABSTRACT

A coupling system including a sun gear coupling (32) and a ring gear coupling (158) for connecting the sun gear(36) and the ring gear housing (50) of a planetary gear train (26) to an external shaft (24) and an external mechanical ground (56) respectively are each characterized by undulant cross sections for accommodating parallel and angular misalignments. A ring gear deflection limiter (158), antirotation spline (190) and vibration damper are also included for enhanced operation.

12 Claims, 2 Drawing Sheets

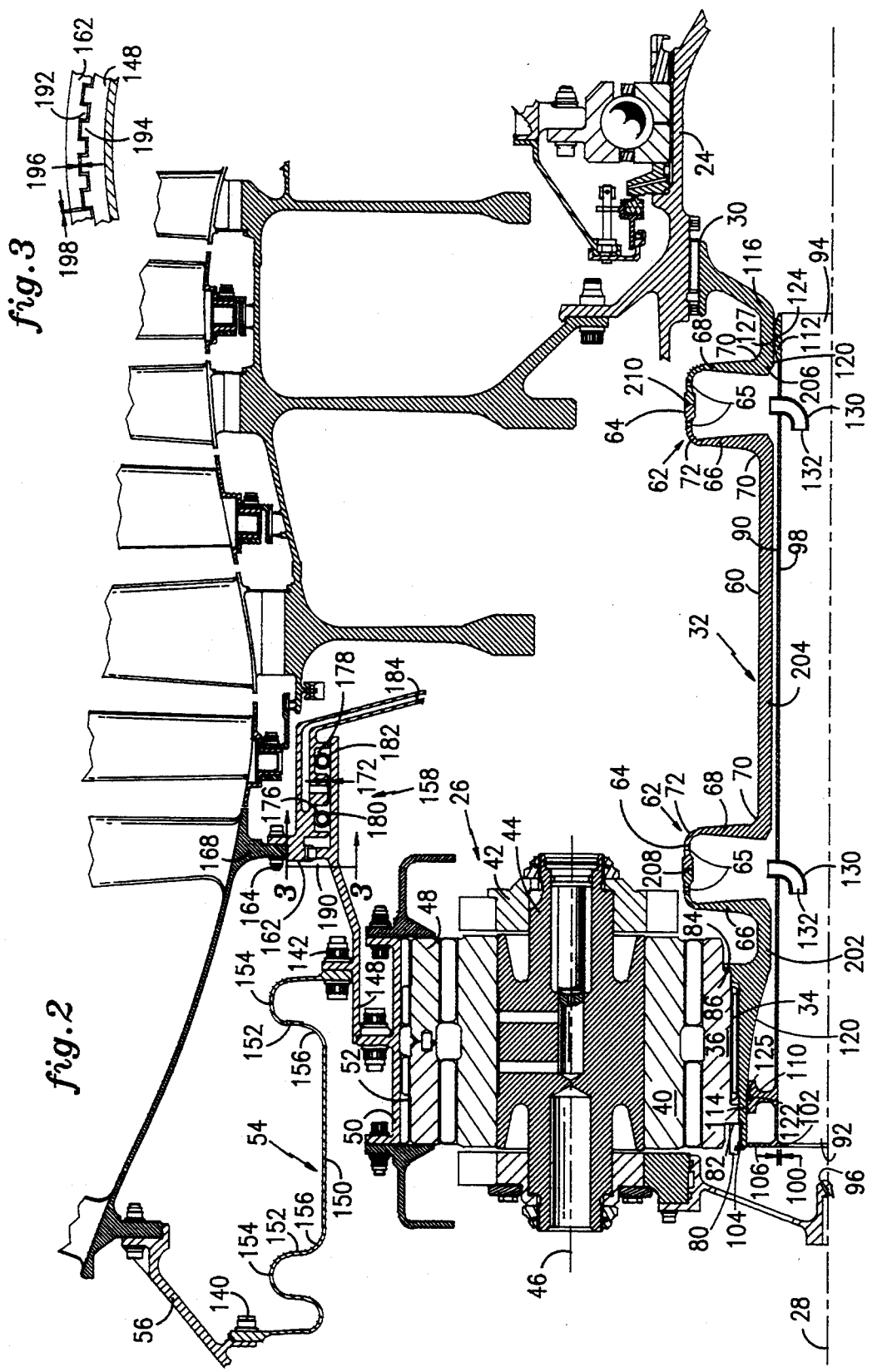

COUPLING SYSTEM FOR A PLANETARY GEAR TRAIN

TECHNICAL FIELD

This invention relates to planetary gear trains and more particularly to a coupling system for flexibly connecting the gear train's sun gear and ring gear to a rotating shaft and a nonrotating mechanical ground respectively so that the reliability and durability of the gear system components are improved. The invention is especially useful in aircraft engines where reliability, durability and simplicity are highly desirable.

BACKGROUND OF THE INVENTION

Planetary gear trains are complex mechanisms for reducing, or occasionally increasing the rotational speed between two rotating shafts or rotors. The compactness of planetary gear trains makes them appealing for use in aircraft engines where space is at a premium.

The forces and torque transferred through a planetary gear train place tremendous stresses on the gear train components, making them susceptible to breakage and wear, even under ideal conditions. In practice, conditions are often less than ideal and place additional stresses on the gear components. For example the longitudinal axes of a planetary gear train's sun gear, planet carrier, and ring gear are ideally coaxial with the longitudinal axis of an external shaft that rotates the sun gear. Such perfect coaxial alignment, however, is rare due to numerous factors including imbalances in rotating hardware, manufacturing imperfections, and transient flexure of shafts and support frames due to aircraft maneuvers. The resulting parallel and angular misalignments impose moments and forces on the gear teeth, the bearings which support the planet gears in their carrier, and the carrier itself. These imposed forces and moments accelerate gear component wear and increase the likelihood that a component will break in service. Component breakage is obviously undesirable in any application, but particularly so in an aircraft engine. Moreover, accelerated component wear necessitates frequent inspections and part replacements which can render the engine and aircraft uneconomical to operate.

The risk of component breakage can be reduced by making the gear train components larger and therefore stronger. Increased size may also reduce wear by distributing the transmitted forces over correspondingly larger surfaces. However increased size offsets the compactness that makes planetary gear trains appealing for use in aircraft engines, and the corresponding weight increase is similarly undesirable. The use of high strength materials and wear resistant coatings can also be beneficial, but escalates the cost of the gear train and therefore does not diminish the desire to reduce wear.

Stresses due to misalignments can also be reduced by the use of flexible couplings to connect the gear train to external devices such as rotating shafts or nonrotating supports. For example, a flexible coupling connecting a sun gear to a drive shaft flexes so that the sun gear remains near its ideal orientation with respect to the mating planet gears even though the axis of the shaft is oblique or displaced with respect to a perfectly aligned orientation. Many prior art couplings, however, contain multiple parts which require lubrication and are themselves susceptible to wear. Prior art couplings may also lack adequate rigidity and strength, with respect to torsion about a longitudinal axis, to be useful in high torque applications. Misalignment can also be accommodated by a splined connection. However the motion that occurs between the contacting spline teeth in a splined connection creates friction which is highly variable and causes the flexibility of such a connection to also be variable.

In view of these shortcomings a simple, reliable, unlubricated coupling system for connecting components of a planetary gear train to external devices while accommodating misalignment therebetween is sought.

DISCLOSURE OF THE INVENTION

According to the present invention, the sun gear and ring gear housing of a planetary gear train are connected to an external shaft and an external mechanical ground respectively, by unique couplings having undulant cross sections for accommodating parallel and angular misalignments. The coupling system is rigid with respect to torsion about the gear train longitudinal axis but is compliant with respect to torsion about the vertical and lateral axes and with respect to translation along all three axes.

In one detailed embodiment, the sun gear is connected to an external shaft by a sun gear coupling which includes a spindle, a ring with a diameter greater than that of the spindle and connected thereto by longitudinally spaced apart diaphragms. The junctures between the spindle, ting, and diaphragms are curved to improve flexibility of the coupling and minimize stress on the junctures. The ring gear housing is connected to an external ground by a ring gear coupling which includes a central hub connected to an arch located radially outwardly of the hub. The juncture between the arch and the hub is curved to improve flexibility of the coupling and minimize stress concentrations thereon.

The invention may also include a deflection limiter for limiting excessive displacement of the ring gear housing, and an anti-torque spline to resist rotation of the ring gear housing in the event that the ring gear coupling breaks or becomes deformed. The deflection limiter and anti torque spline may be used individually or in combination and the deflection limiter may include a damper for damping vibrations normally encountered during operation.

The primary advantage of the invention is the reduced maintenance cost and improved reliability of the gear train due to reduced wear and reduced risk of breakage of gear train components.

Further advantages of the invention include the simplicity and reliability of the couplings arising from the absence of multiple parts which are susceptible to wear and may require lubrication.

The foregoing and other features and advantages, and the operation of the invention will become more apparent in light of the following description of the best mode for carrying out the invention and the accompanying drawings.

BRIEF DESCRIPTION OF THE FIGURES

FIG. 2 is an upper cross sectional elevation of the planetary gear train of FIG. 1 showing the coupling system of the present invention.

FIG. 3 is a fragmentary frontal elevation of an antitorque spline of the present invention taken along the section line 3—3 of FIG. 2.

BEST MODE FOR CARRYING OUT THE INVENTION

Figure 1:
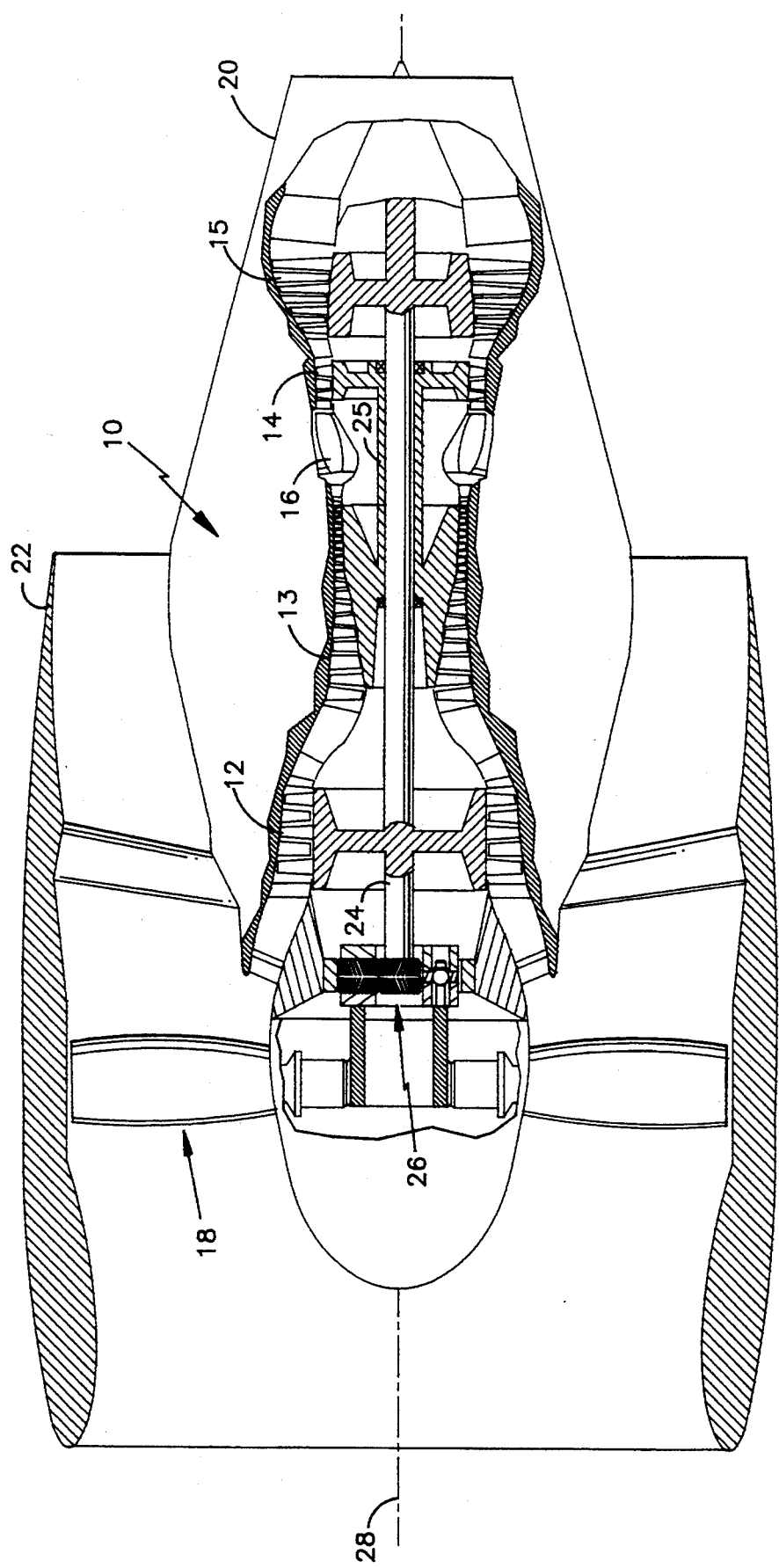
FIG. 1 is a schematic cross sectional side elevation of a turbine engine with a planetary gear train interposed between a compressor and fan employed therein.

Referring to FIG. 1, a turbine engine 10 includes as its principal components one or more compressors 12, 13, one or more turbines 14, 15 for powering the compressors, a combustion chamber 16, a fan 18, a primary exhaust 20 and a fan exhaust nozzle 22. A shaft such as shafts 24, 25 extends from each turbine to drive the corresponding compressor. The rotary motion of one of the compressors is conveyed to the fan 18 by way of a planetary gear train 26 in a manner more completely described hereinafter. The planetary gear train reduces the rotational speed of the compressor to a speed more suitable for the efficient operation of the fan. The principal engine components are ideally concentric with a central longitudinal axis 28.

FIG. 2 shows the planetary gear train 26 of FIG. 1 and its relationship to the engine and to the coupling system of the present invention in greater detail. The forward end of the compressor drive shaft 24 is joined by splines 30 to the aft end of a sun gear coupling 32. The forward end of the coupling is joined, also by a spline 34, to the sun gear 36 of planetary gear train 26. Rotary motion of the shaft is thus transferred to sun gear 36. The sun gear meshes with multiple planet gears, of which the illustrated planet gear 40 is representative. Each planet gear is rotatably mounted in planet carrier 42 by a journal pin 44 or other suitable bearing so that rotary motion of the sun gear urges each planet gear to rotate about its own longitudinal axis 46. Each planet gear also meshes with a nonrotating ring gear 48 mounted in a ring gear housing 50 by splines 52. A ring gear coupling 54 joins the ring gear housing to a mechanical ground. In the illustrated embodiment the ground is a nonrotating roller bearing support 56, but can be any ground capable of resisting rotation of the housing and hence of the ring gear. Since the planet gears mesh with both the nonrotating ring gear and the rotating sun gear, the planet gears not only rotate about their own axes 46 but also orbit the sun gear causing the planet carrier 42 to rotate about axis 28. The planet carrier motion is conveyed to the fan 18 (FIG. 1) by any suitable means, not shown.

The coupling system of the present invention includes the sun gear coupling 32 and the ring gear coupling 54. The sun gear coupling has an inflexible spindle 60 and at least one undulant flexible section 62. The flexible section includes a cylindrical ring 64 with drain holes 65 distributed around the circumference of each ring so that any oil which inadvertently leaks into the interior of the undulant section will not accumulate therein and cause a rotary imbalance. The ring has a diameter greater than that of the spindle, and is joined to the spindle by longitudinally spaced diaphragms 66 and 68. The junctures 70 between the diaphragms and the spindle as well as the junctures 72 between the diaphragms and the ring, have a curved cross sectional profile to improve the flexibility of the coupling and minimize stress concentrations at the junctures. A single flexible section is adequate for accommodating angular misalignment between the sun gear 36 and the shaft 24. Two or more longitudinally spaced apart flexible sections are used for accommodation of parallel misalignment or a combination of angular and parallel misalignment. The splines 30 and 34 at either end of the coupling do not contribute materially to the flexibility of the coupling; rather the coupling derives its flexibility primarily from the undulant sections. The torsional rigidity of the ring 64 and spindle 60 make the coupling rigid with respect to torsion about the longitudinal axis. In addition, the undulant character of the flexible section makes the coupling compliant with respect to torsion about vertical and lateral axes (i.e. with respect to angular misalignments in a horizontal plane and in a vertical plane parallel to axis 28) and with respect to translation about all three axes. Accordingly, the coupling transmits high torque while isolating the gear train from forces and moments arising from misalignments between the sun gear and the external shaft.

The sun gear coupling is longitudinally retained by a nut 80 threaded onto the forward end of the coupling. The nut seats against a forward shoulder 82 on the sun gear thereby urging shoulder 86 on the coupling into contact with aft shoulder 84 on the sun gear. Contact between the forward shoulder and the nut prevents aft longitudinal displacement of the coupling while contact between the cooperating shoulders 84, 86 prevents forward longitudinal displacement of the coupling.

It may be desirable to use the interior of the sun gear coupling as an oil supply conduit, for example to deliver oil rearward to spline 30. The sun gear coupling may therefore include a flexible tubular insert 90 having an inlet 92 and an outlet 94. Oil, not shown, is supplied to the inlet by passages 96 and is centrifuged radially outward by the rotation of the coupling and insert, so that the oil forms a film on the inner surface 98 of the insert. The maximum depth of the film is limited to the height 100 of a lip 102 at the inlet. The interior diameter of the insert may be constant, but ideally the diameter increases continuously from the inlet to the outlet to s encourage the centrifuged oil to flow longitudinally rearward rather than forward. A snap ring 104 disposed in an annular slot around the interior of nut 80 bears against a forward flange 106 of the insert to provide longitudinal retention thereof within the interior of the spindle. Forward and aft standoffs 110 and 112 each form a ring around the circumference of the insert to support it radially within the coupling. The surfaces 114 and 116 of the standoffs are spherical so that they will roll along the inner wall 120 of the coupling and not resist the flexure thereof. Each spherical surface also has a groove 122, 124 within which a seal ring 125, 127 is disposed to prevent oil leakage into the undulant sections. A group of elbows 130 associated with each of the undulant flexible sections extends through the wall of the insert so that the interior of each undulant section can be readily inspected with a flexible optical instrument, not shown. The optical instrument is inserted longitudinally along the coupling, and into the mouth 132 of an elbow. Further insertion of the instrument causes it to follow the contour of the elbow and bend radially outward so that the interior of the diaphragms 66, 68 and the ring 64 can be easily viewed. The mouth of each elbow is radially spaced from the inner surface 98 of the insert by a distance equal to at least the radial height 100 of lip 102. This ensures that the oil film, whose radial depth will be no larger than height 100, will not be captured by the mouth and centrifuged into the interior of the undulant section where it can cause a rotary imbalance. In the preferred embodiment, three elbows are used at each undulant section, however any number of elbows greater than or equal to two can be used provided they are equally distributed around the circumference of the insert to preclude imbalance.

The coupling system of the present invention also includes ring gear coupling 54. Bolts 140 secure the forward end of the ring gear coupling to a nonrotating bearing support 56. Bolts 142 secure the aft end of the coupling to support 148 which extends longitudinally from and is part of the ring gear housing 50. The ring gear coupling has an inflexible hub 150 and at least one undulant flexible portion 152. The flexible portion has an arch 154 radially outward of the hub. The junctures 156 between the hub and arch are curved in cross section to improve flexibility of the coupling and minimize stress concentrations thereon. A single flexible portion is adequate for accommodating angular misalignment between the ring gear 48 and the central axis 28. Two or more longitudinally spaced apart flexible sections are used for accommodation of parallel misalignment or a combination of angular and parallel misalignment. The torsional rigidity of the arch 154 and hub 150 make the coupling rigid with respect to torsion about the longitudinal axis. The undulant character of the flexible portion makes the coupling compliant with respect to torsion about vertical and lateral axes and with respect to translation about all three axes. Accordingly, the coupling resists rotation of the ring gear housing while isolating the gear train from forces and moments arising from misalignments between the ring gear housing and the central longitudinal axis 28.

Because the planetary gear train is flexibly coupled to its neighboring components in the engine, it can be radially displaced from its ideally centered position. While such behavior is consistent with and necessary for reducing wear on the gear train components, excessive displacement is undesirable. For example, high amplitude displacements of the gear train (resulting, for example from an unexpected rotary imbalance in an external device to which the gear train is coupled) can break the sun gear coupling, leaving the fan unpowered, or can break the ring gear coupling, leaving the gear train unsupported in the engine.

To limit excessive radial displacement of the gear train, the coupling system, and in particular the ring gear coupling, may include a deflection limiter 158. The deflection limiter includes longitudinally extending first support 148 and a second support 162, at least partially longitudinally coextensive with the first support. The second support is secured by bolts 164 to the wall 168 forming the inner flow path boundary of the engine and thus serves as a mechanical ground. The first and second supports are radially spaced apart by a small gap 172 so that excessive radial displacement of the ring gear housing is precluded by contact between the supports. The energy associated with such excessive displacements is transferred through the second support and to the flow path wall which absorbs the energy of contact without sustaining damage.

It is also desirable to dissipate the energy associated with normal vibrations of the gear train. Accordingly, the second support of the preferred embodiment includes a pair of grooves 176 and 178 with fluid seals 180, 182 disposed therein. The second support also has a conduit 184 for supplying a viscous vibration damping fluid, not shown, from a source, also not shown, to the annulus of height 172 bounded by the seals and the first and second supports. The first and second supports thus cooperate to define a squeeze film damper Whose principals of operation are well known and therefore are not further described herein.

The first and second supports of the preferred embodiment also include cooperating anti-torque splines 190. As illustrated in FIG. 3, the spline teeth 192, 194 are not normally in contact, but instead are separated radially and circumferentially by clearances 196, 198 which are larger than the gap 172 (FIG. 2) in the deflection limiter 158. Therefore, the deflection limiter, rather than the spline, regulates the maximum radial displacement of the ring gear housing. However if the ring gear coupling deforms or twists excessively about the longitudinal axis, (for example because of the application of unexpectedly high torque) the splines engage to provide an alternate torque path for resisting rotation of the ring gear housing and to prevent further deformation of the coupling. Likewise, if the ring gear coupling is broken, the splines engage to resist rotation of the ring gear housing while the first and second supports assure vertical and lateral support of the housing.

The undulant sun gear and ring gear couplings of the present invention are of continuous construction, that is, there are no readily separable joints such as bolted flanges along the longitudinal length of the couplings. The ring gear coupling is made from a continuous sheet of metal which is cold formed in a mold into the desired undulant shape and subsequently bent to bring its lateral edges into abutting contact. The abutting lateral edges are then welded together. The sun gear coupling is made of three forged, machined pieces 202, 204, 206 which are electron beam welded at weld joints 208 and 210 (not readily discernible in the finished part) to form a continuous coupling. The region of each ring 64 immediately adjacent the weld joint is thicker than the rest of the ring to reduce stresses by maximizing the surface area over which forces acting on the joint are distributed. The continuous character of the couplings provides greater flexibility than could be obtained with a bolted flange in an equivalent radial space.

The coupling system provides unique operational advantages not available with prior art couplings. The sun gear and ring gear couplings are rigid with respect to torsion about the longitudinal axis and consequently transmit or resist high torque about the longitudinal axis. Within the elastic limits of the materials used for their construction, the couplings are flexible with respect to torsion about lateral and vertical axes and with respect to translation along all three axes. If, for example, the drive shaft 24 becomes misaligned with the longitudinal axis 28, the sun gear coupling flexes to ensure that the sun gear axis remains at or near its ideal orientation thereby maintaining optimum contact between the sun gear and planet gear teeth. If the flexible coupling were not present, the misalignment of the shaft would reorient the sun gear and impose additional stress on the meshing sun gear and planet gear teeth. The coupling system of the present invention achieves such flexibility without the mechanical complexity of multiple constituent parts characteristic of some prior art couplings. Moreover, the couplings of the present system require no lubrication and are radially compact.

The best mode for carrying out the invention was presented in the context of a speed reducing planetary gear train whose sun gear accepts an input from an external source of rotary motion and whose planet carrier drives an external rotary device. However the invention is equally applicable to a speed amplifying gear train whose input is directed to the planet carrier and whose output is delivered by the sun gear.

The best mode for carrying out the invention also describes the combined use of the undulant sun gear coupling and ring gear coupling to achieve maximum tolerance to parallel and angular misalignments. In less demanding applications it may be acceptable to use a single undulant coupling to connect one of the sun gear and planet carrier to a first external device while using a more conventional coupling for connecting the other of the sun gear and planet carrier to a second external device.

The damper formed by the cooperation of the first and second supports has been described as a squeeze film damper, however other dampers, such as an elastic material can be introduced into the gap between the inner and outer supports to damp vibrations normally encountered during operation.

These and other modifications to the invention can be made without departing from the spirit and scope of the appended claims.

I claim:

1. In a planetary gear train having:
   a sun gear rotatable by a shaft,
   a ring gear secured to a ring gear housing, and
   a plurality of planet gears rotatably mounted in a planet carrier and meshing with said sun gear and said ring gear,
   a coupling system, characterized by:
   a sun gear coupling connecting said sun gear to said shaft, said sun gear coupling having at least one undulant flexible section joined to an inflexible spindle for accommodating misalignment between said sun gear and said shaft; and
   ring gear coupling connecting said ring gear housing to a nonrotating mechanical ground, said ring gear coupling having at least one undulant flexible portion joined to an inflexible hub for accommodating misalignment between said ring gear housing and said mechanical ground.

2. The coupling system of claim 1, characterized by:
   said flexible section comprising a cylindrical ring having diameter greater than the diameter of said spindle and joined thereto by two longitudinally spaced apart diaphragms, the juncture between said diaphragms, said ring and said spindle being curved in cross section to improve flexibility and minimize stress concentrations; and
   said flexible portion comprising an arch radially outward of and connected to said hub, the juncture therebetween being curved in cross section to improve flexibility and minimize stress.

3. The coupling system of claim 1 characterized by a tubular insert secured within the interior of said spindle and having at least two elbows associated with each of said undulant flexible sections for guiding an optical instrument into position to inspect the interior of said flexible sections.

4. The coupling system of claim 1 characterized by a deflection limiter comprising a first support extending longitudinally from said ring gear housing and a second support secured to said mechanical ground, said second support being at least partially longitudinally coextensive with and radially spaced apart from said first support so that contact between said first and second supports precludes excessive radial displacement of said ring gear housing.

5. The coupling system of claim 4 characterized by a vibration damper disposed radially intermediate said first support and said second support to limit the vibration of said ring gear housing.

6. The coupling system of claim 5 characterized by said damper being a squeeze film damper.

7. The coupling system of claim 1 characterized by said ring gear housing having an anti-torque spline, and said mechanical ground having a cooperating spline, said splines being disengaged during normal operation and being engaged to resist rotation of said ring gear housing in the event of the breakage or deformation of said ring gear coupling.

8. The coupling system of claim 1 characterized by said flexible section and said flexible portion each being continuous.

9. The coupling system of claim 1 characterized by said sun gear coupling being driven by a source of torque and rotary motion and said planet carrier supplying torque and rotary motion to an external rotary device.

10. In a planetary gear train having
    a sun gear rotatable by a shaft,
    a ring gear secured to a ring gear housing, and
    a plurality of planet gears rotatably mounted in a planet carrier and meshing with said sun gear and said ring gear,
    a coupling system, characterized by:
    a sun gear coupling connecting said sun gear to said shaft, said sun gear coupling having at least one undulant flexible section joined to an inflexible spindle for accommodating misalignment between said sun gear and said shaft, said flexible section comprising a cylindrical ring having a diameter greater than the diameter of said spindle and joined thereto by two longitudinally spaced apart diaphragms, the juncture between said diaphragms, said ring and said spindle being curved in cross section to improve flexibility and minimize stress concentrations;
    a ring gear coupling connecting said ring gear housing to a nonrotating mechanical ground, said ring gear coupling having at least one undulant flexible portion joined to an inflexible hub for accommodating misalignment between said ring gear coupling and said mechanical ground, said flexible portion comprising an arch radially outward of and connected to said hub, the juncture therebetween being curved in cross section to improve flexibility and minimize stress concentrations;
    a deflection limiter comprising a first support extending longitudinally from said ring gear housing and a second support secured to said mechanical ground, said second support being at least partially longitudinally coextensive with and radially spaced apart from said first support so that contact between said first and second supports precludes excessive radial displacement of said ring gear housing.
    a vibration damper disposed radially intermediate said first support and said second support to limit the vibration of said ring gear housing;
    said ring gear housing having an anti-torque spline, and said mechanical ground having a cooperating spline, said splines being disengaged during normal operation and being engaged to resist rotation of said ring gear housing in the event of the breakage or deformation of said ring gear coupling.

11. In a planetary gear train having sun gear connected to a first external device, a ring gear secured to a ring gear housing, said ring gear housing being connected to a second external device, and a plurality of planet gears rotatably mounted in a planet carrier and meshing with said sun gear and said ring gear, a coupling, characterized by:

at least one undulant flexible section joined to an inflexible spindle, said flexible section comprising a cylindrical ring having a diameter greater than the diameter of said spindle and joined thereto by two longitudinally spaced apart diaphragms, the juncture between said diaphragms, said ring and said spindle being curved in cross section to improve flexibility and minimize stress concentrations, said coupling connecting one of said sun gear and said ring gear housing to an external device and accommodating misalignment therebetween.

12. In a planetary gear train having a sun gear connected to a first external device, a ring gear secured to a ring gear housing, said ring gear housing being connected to a second external device, and a plurality of planet gears rotatably mounted in a planet carrier and meshing with said sun gear and said ring gear, a coupling, characterized by:

at least one undulant flexible portion joined to an inflexible hub, said flexible portion comprising an arch radially outward of and connected to said hub, the juncture therebetween being curved in cross section to improve flexibility and minimize stress concentrations, said coupling connecting one of said sun gear and said ring gear housing to an external device and accommodating misalignment therebetween.

* * * * *

UNITED STATES PATENT AND TRADEMARK OFFICE
CERTIFICATE OF CORRECTION

PATENT NO. : 5,433,674

DATED : July 18, 1995

INVENTOR(S) : William G. Sheridan and Gino J. Pagluica

It is certified that error appears in the above-identified patent and that said Letters Patent is hereby corrected as shown below:

Column 7, line 9, the term "planet carrier" should read
-- ring gear housing --.

Column 7, line 9, the term "planet carrier" should read
-- ring gear housing --.

Signed and Sealed this

Eleventh Day of June, 1996

*Attest:*

BRUCE LEHMAN

*Attesting Officer*     *Commissioner of Patents and Trademarks*